United States Patent
Miller et al.

(10) Patent No.: US 12,111,452 B2
(45) Date of Patent: Oct. 8, 2024

(54) FOLDED OPTICS WITH TILT ACTUATOR AND SPRING SUSPENSION

(71) Applicant: Apple Inc., Cupertino, CA (US)

(72) Inventors: Scott W. Miller, Los Gatos, CA (US); Alfred N. Mireault, San Francisco, CA (US); Junwei Liu, Millbrae, CA (US); Hao Zheng, San Jose, CA (US)

(73) Assignee: Apple, Inc., Cupertino, CA (US)

( * ) Notice: Subject to any disclaimer, the term of this patent is extended or adjusted under 35 U.S.C. 154(b) by 526 days.

(21) Appl. No.: 17/408,310

(22) Filed: Aug. 20, 2021

(65) Prior Publication Data

US 2022/0066287 A1    Mar. 3, 2022

Related U.S. Application Data (60) Provisional application No. 63/071,277, filed on Aug. 27, 2020.

(51) Int. Cl.
  *G02B 13/00* (2006.01)
  *G02B 7/18* (2021.01)
  (Continued)

(52) U.S. Cl.
  CPC ....... *G02B 13/0065* (2013.01); *G02B 7/1805* (2013.01); *G02B 27/646* (2013.01);
  (Continued)

(58) Field of Classification Search
  None
  See application file for complete search history.

(56) References Cited

U.S. PATENT DOCUMENTS 10,416,472 B2 *  9/2019  Jeong ................. H02K 1/34
10,678,029 B1    6/2020  Goldenberg et al.
(Continued)

FOREIGN PATENT DOCUMENTS

CN    107533273    1/2018
CN    107800929    3/2018
(Continued)

OTHER PUBLICATIONS

Chinese Office Action from Chinese Patent Application No. 2021109902928, dated Oct. 11, 2023, pp. 1-5.
(Continued)

*Primary Examiner* — Derek S. Chapel
(74) *Attorney, Agent, or Firm* — Robert C. Kowert; Kowert, Hood, Munyon, Rankin & Goetzel, P.C.

(57) ABSTRACT

Various embodiments include a tilt actuator and a spring suspension arrangement for use in a camera having a folded optics arrangement. In some embodiments, the folded optics arrangement may include a light path-folding element that is coupled with a carrier and that is tilted using the tilt actuator. The spring suspension arrangement may suspend the carrier and the light path-folding element from a base structure, and may allow motion of the light path-folding element enabled by the tilt actuator. The spring suspension arrangement may include one or more springs attached to the carrier and to the base structure. In some embodiments, the spring suspension arrangement may further include one or more suspension wires attached to the spring(s) and to a stationary structure of the camera.

20 Claims, 7 Drawing Sheets

(51) Int. Cl.
*G02B 27/64* (2006.01)
*G03B 3/10* (2021.01)
*G03B 5/00* (2021.01)
*G03B 13/36* (2021.01)
*G03B 17/17* (2021.01)
*G03B 30/00* (2021.01)
*H04N 23/54* (2023.01)
*H04N 23/55* (2023.01)
*H04N 23/68* (2023.01)

(52) U.S. Cl.
CPC ............... *G03B 3/10* (2013.01); *G03B 5/00* (2013.01); *G03B 13/36* (2013.01); *G03B 17/17* (2013.01); *G03B 30/00* (2021.01); *H04N 23/54* (2023.01); *H04N 23/55* (2023.01); *H04N 23/686* (2023.01); *G03B 2205/0015* (2013.01); *G03B 2205/0023* (2013.01); *G03B 2205/0069* (2013.01)

(56) References Cited

U.S. PATENT DOCUMENTS

| | | | |
|---|---|---|---|
| 2012/0128339 A1* | 5/2012 | Hu | G03B 5/06 359/555 |
| 2013/0314587 A1 | 11/2013 | Kriman et al. | |
| 2018/0067335 A1 | 3/2018 | Chen et al. | |
| 2018/0329276 A1* | 11/2018 | Hu | G03B 17/17 |
| 2020/0241315 A1* | 7/2020 | Hu | G02B 7/09 |
| 2021/0223567 A1* | 7/2021 | Li | H04N 23/55 |
| 2023/0072601 A1* | 3/2023 | Park | G02B 27/646 |

FOREIGN PATENT DOCUMENTS

| | | | | |
|---|---|---|---|---|
| CN | 108873239 A | * | 11/2018 | ............ G02B 27/64 |
| CN | 115053154 A | * | 9/2022 | ......... G02B 13/0065 |
| KR | 20200073023 | | 6/2020 | |

OTHER PUBLICATIONS

"APP OIS Large Angle Module", Retrieved from www.app.hk.com/index-php/technology/ois-large-angle-module on Jun. 24, 2020, pp. 1-4.

Chinese Office Action from Chinese Patent Application No. 2021109902928, dated Apr. 4, 2024, pp. 1-9.

* cited by examiner

FOLDED OPTICS WITH TILT ACTUATOR AND SPRING SUSPENSION

This application claims benefit of priority to U.S. Provisional Application Ser. No. 63/071,277, entitled "Folded Optics with Tilt Actuator and Spring Suspension," filed Aug. 27, 2020, and which is incorporated herein by reference in its entirety.

BACKGROUND

Technical Field

This disclosure relates generally to a tilt actuator and a spring suspension for use in a camera having a folded optics arrangement.

Description of the Related Art

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis of the camera to refocus the camera.

BRIEF DESCRIPTION OF THE DRAWINGS

FIGS. 2A and 2B illustrate views of an example prism module that may be used in a camera having a folded optics arrangement, in accordance with some embodiments. The prism module may include a tilt actuator and/or a spring suspension arrangement in various embodiments.

FIGS. 3A and 3B illustrate views of an example spring suspension arrangement that may be used in a camera having a folded optics arrangement and/or a tilt actuator, in accordance with some embodiments. FIG. 3B shows a top view of the spring suspension arrangement.

FIGS. 4A-4D illustrate views of an example spring suspension arrangement that may be used, for example, in a prism module having a prism that may be tilted via a tilt actuator, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Some embodiments include a tilt actuator and a suspension arrangement for use in a camera having a folded optics arrangement. In some embodiments, the folded optics arrangement may include a light path-folding element (e.g., a prism, a mirror, or the like) that is coupled with a carrier. The carrier may be tilted relative to a base structure using the tilt actuator, e.g., to provide optical image stabilization (OIS) in at least one direction. The spring suspension arrangement may suspend the carrier and the light path-folding element from the base structure, and may allow motion of the light path-folding element enabled by the tilt actuator. The spring suspension arrangement may include one or more springs attached to the carrier and to the base structure. In some embodiments, the spring suspension arrangement may further include one or more suspension wires attached to the spring(s) and to a stationary structure of the camera. According to some embodiments, the spring suspension arrangement may be designed to have relatively low stiffness in the direction of tilt, and relatively high stiffness in directions that are undesirable for motion of the light path-folding element. As will be discussed in further detail herein, the spring suspension arrangement comprises multiple portions that function differently and that can be independently tuned to achieve the desired modal performance.

According to various embodiments, the tilt actuator may comprise a voice coil motor (VCM) actuator. For example, the VCM actuator may include a stationary magnet and a moveable coil. In some embodiments, the stationary magnet may be attached to the base structure and positioned proximate the coil. The coil may be attached to the carrier, such that the coil moves together with the carrier and the light path-folding element. In some embodiments, the stationary magnet may reduce magnetic coex sensitivity between adjacent camera modules and/or to system magnetic coex aggressors.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

Figure 1:
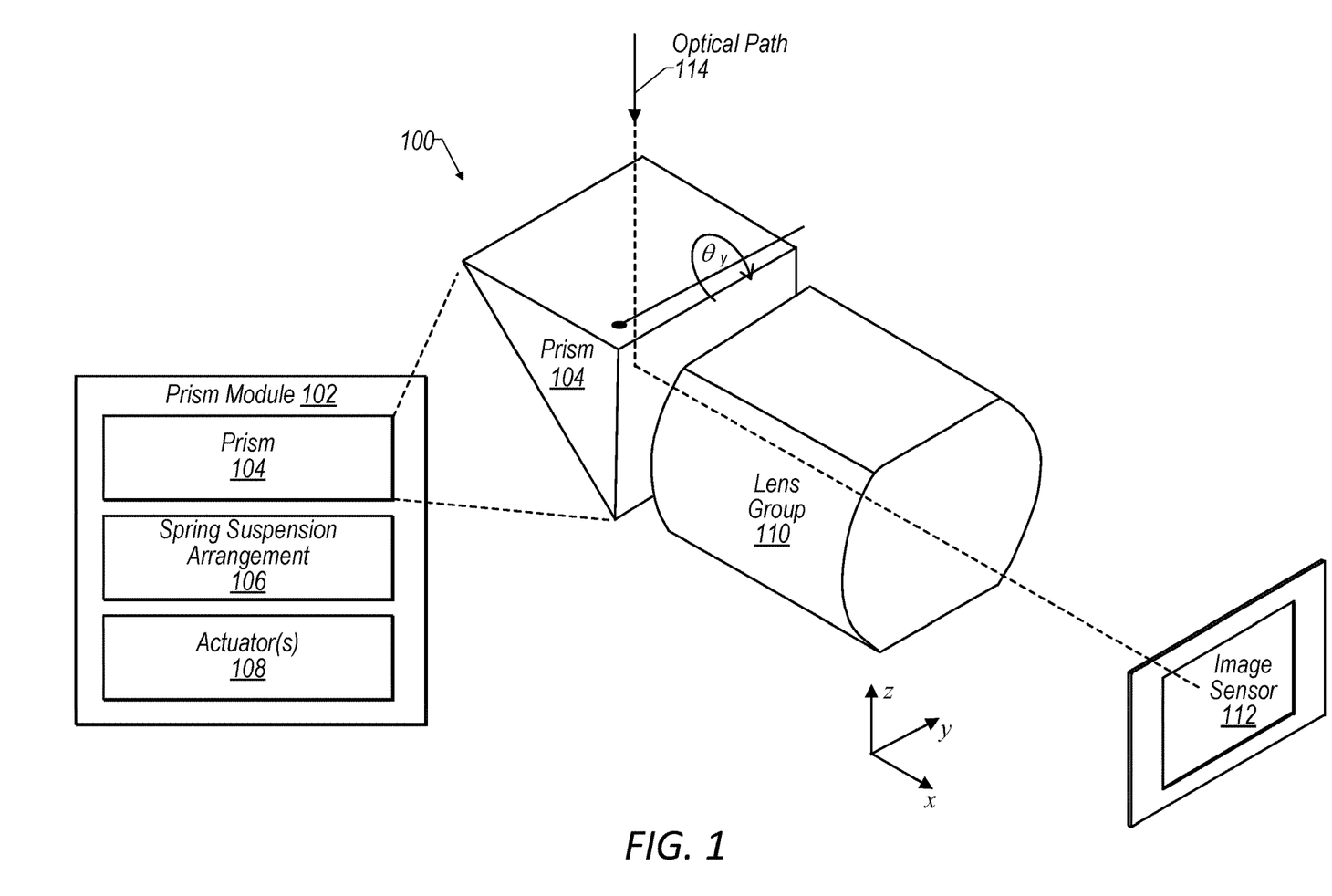
FIG. 1 illustrates a schematic perspective view of an example camera having a folded optics arrangement and that may include a tilt actuator and/or a spring suspension arrangement, in accordance with some embodiments.

Described herein are embodiments of a camera that includes a tilt actuator and/or a spring suspension arrangement. The arrangements discussed throughout generally relate to a camera having a folded optics arrangement, with one or more optical elements (e.g., a prism, a lens group, etc.) and/or the image sensor being moveable via one or more actuators to provide optical image stabilization (OIS) and/or autofocus (AF) during imaging. FIG. 1 shows a generalized example of such a camera 100. The example X-Y-Z coordinate system shown in FIG. 1 may apply to embodiments discussed throughout this disclosure.

According to various embodiments, the camera 100 may include at least one light path-folding element (e.g., a prism, a mirror, etc.; also referred to herein as a "light folding element") that can be tilted relative to one or more other optical elements and/or an image sensor. For example, the camera 100 may include a prism module 102 comprising a prism 104, a spring suspension arrangement 106, and/or one or more actuators 108. Furthermore, as indicated in FIG. 1, the camera 100 may include a lens group 110 and an image sensor 112 in some embodiments. The lens group 110 may include one or more lens elements. The image sensor 112 may capture image data based on light that has passed through at least a portion of the folded optics arrangement. The camera 100 is intended to provide an example of a camera having a folded optics arrangement; various embodiments, however, may include one or more differences (e.g., with respect to number of optical elements, type(s) of optical elements, and/or positioning of components, etc.) relative to the configuration of the camera 100 shown in FIG. 1.

In some embodiments, the lens group 110 may be located between the prism 104 (and/or the prism module 102) and the image sensor 112. The prism 104 and the lens group 110 may form a folded optics arrangement (e.g., a single fold optics arrangement as indicated in FIG. 1) through which light passes before reaching the image sensor 112. Light may follow an optical path 114 that is folded by prism 104 such that the light is directed towards the lens group 110, passes through the lens group 110, and then reaches the image sensor 112. In some examples, light may enter an object side of the prism 104 in a direction parallel to the Z-axis. The prism 104 may redirect the light to propagate in the X-axis direction (which may be parallel to an optical axis defined by the lens group 110), e.g., such that the light exits a lens group facing side of the prism 104, towards the lens group 1120. The light may pass through the lens group 110 and continue propagating in the X-axis direction towards the image sensor 112 (which may be vertically oriented, e.g., such that the image sensor 112 defines a plane that is orthogonal to the X-axis and/or the optical axis defined by the lens group 110). The prism 104, the lens group 110, and/or the image sensor 112 may be positioned along a common axis (e.g., the X-axis, the optical axis defined by the lens group 110, etc.). According to some examples, the optical path 114 may be contained within a plane (e.g., parallel to the X-Z plane), and the image sensor 112 may extend along a different plane (e.g., parallel to the Y-Z plane).

In some embodiments, the object side of the prism 104 may extend along the X-Y plane. Furthermore, the prism 104 may include a pair of opposing lateral sides that each extend along the X-Z plane, a lens group facing side that extends along the Y-Z plane, and a reflecting surface side that is angled relative to one or more of the other sides of the prism 104. For example, the reflecting surface side of the prism 104 may include a reflective surface that is angled so as to redirect light received from the object side of the prism 104 towards the lens group 110 (via the lens group facing side of the prism 104) and the image sensor 112, as discussed above.

While a prism is shown in various figures as an example of a light path-folding element, the camera systems and/or folded optics arrangements described herein may include any suitable light path-folding element (e.g., a mirror or the like) or combination of elements. In some embodiments, a light path-folding element may also act as a lens element (or combination of lens elements). For example, one or more lens elements (e.g., other than those of the lens group 110) may be integrated with the prism 104 (and/or another prism) such that the prism acts as a lens element. Additionally, or alternatively, the prism 104 may be shaped such that the prism acts as a lens element.

In various embodiments, the prism 104 and/or the lens group 110 may be coupled with one or more actuators (e.g., as also discussed herein with reference to at FIGS. 2A-2B) configured to move the prism 104 and/or the lens group 110 to provide optical image stabilization (OIS) and/or autofocus (AF) functionality. For example, the prism 104 may be coupled with actuator(s) 108 configured to tilt or otherwise move the prism 104. As indicated in FIG. 1, in various embodiments the actuator(s) 108 may be configured to tilt the prism 104 about one or more axes to provide OIS functionality. According to various embodiments, the actuator(s) 108 may include a tilt actuator for tilting the prism 104 about the Y-axis (tilt indicated in FIG. 1 as $\theta_y$) to provide OIS-Z movement (e.g., movement that shifts the image projected onto the image sensor 112 in the Z-axis). In some embodiments, the actuator(s) 108 may additionally or alternatively tilt the prism 104 about the Z-axis to provide OIS-Y movement (e.g., movement that shifts the image projected onto the image sensor 112 in one or more directions parallel to the Y-axis). In various embodiments, the camera 100 may include one or more actuators for translating or otherwise moving the lens group 110. For example, the actuator(s) may linearly translate the lens group 110 in a direction parallel to the X-axis to provide AF movement.

Figure 2A:
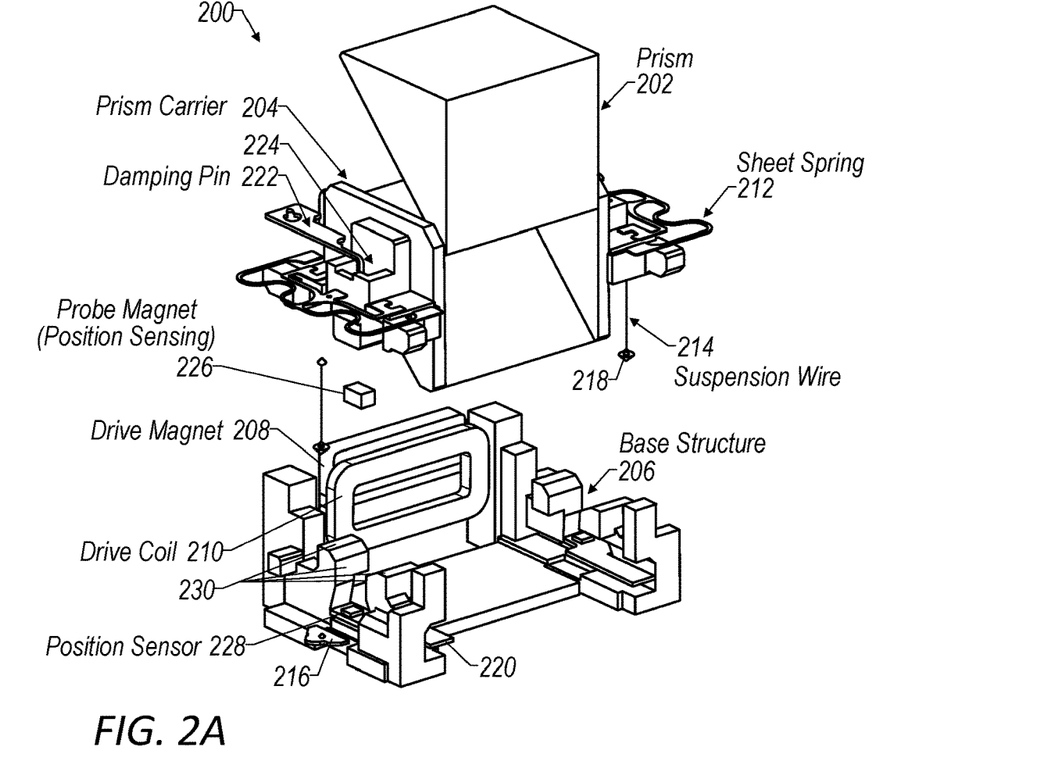
FIG. 2A shows a perspective exploded view of the prism module.
Figure 2B:
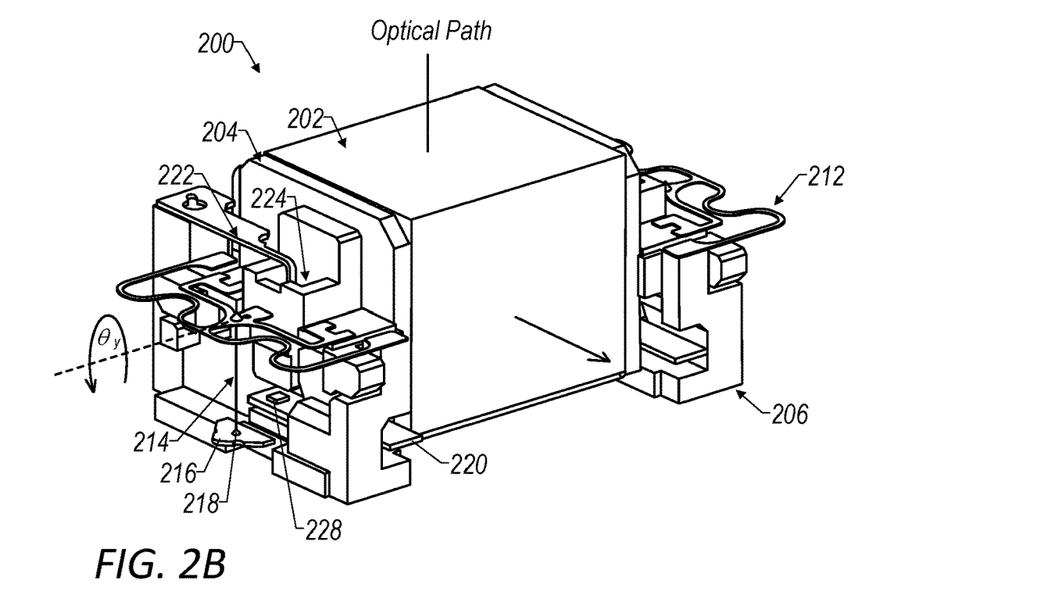
FIG. 2B shows a perspective view of the prism module (with components in an assembled state).

In some embodiments, the actuator(s) 108 (and/or other actuator(s) of the camera 100) may comprise one or more voice coil motor (VCM) actuators, e.g., as described herein with reference to FIGS. 2A-2B. However, the camera 100 may additionally, or alternatively, include one or more other types of actuators (e.g., a piezoelectric actuator, a comb drive actuator, etc.) in some embodiments.

As previously mentioned, the prism module 102 may include the prism 104, the spring suspension arrangement 106, and/or the actuator(s) 108. In some embodiments, the prism module 102 may include one or more aspects discussed in further detail with reference to FIGS. 2A-4D. For example, the prism module 102 may include a carrier (e.g., prism carrier 204 in FIGS. 2A-4D) and a base structure (e.g., base structure 206 in FIGS. 2A-4D). The carrier may be coupled with the prism 104, such that the carrier is moveable (e.g., via the actuator(s) 108) together with the prism 104. The base structure may be stationary relative to motion of the carrier. The spring suspension arrangement 106 may be configured to suspend the carrier from the base structure and to allow motion of the prism 104 enabled by the actuator(s) 108. In some embodiments, the spring suspension arrangement 106 may include one or more springs (e.g., sheet spring(s) 212 in FIGS. 2A-2B, spring(s) 302 in FIGS. 3A-4D, etc.) and/or one or more wires (e.g., suspension wire(s) 214 in FIGS. 2A-2B, wire(s) 304 in FIGS. 3A-4D, etc.).

FIGS. 2A and 2B illustrate views of an example prism module 200 that may be used in a camera (e.g., camera 100 in FIG. 1) having a folded optics arrangement. The prism module 102 described herein with reference to FIG. 1 may be the same as, or similar to, the prism module 200 in various embodiments. FIG. 2A shows a perspective exploded view of the prism module 200. FIG. 2B shows a perspective view of the prism module 200 (with components in an assembled state).

In some embodiments, the prism module 200 may include a prism 202, a prism carrier 204, a base structure 206, one or more actuators (e.g., a VCM actuator comprising a drive magnet 208 and a drive coil 210), and/or a spring suspension arrangement (e.g., comprising sheet spring(s) 212 and/or suspension wire(s) 214). While FIGS. 2A-4D refer to "prism 202" and/or "prism carrier 204," it should be understood that prism 202 may be any suitable light path-folding element, and the prism carrier 204 may be any suitable light path-folding element carrier in various embodiments.

In some embodiments, the actuator(s) may include one or more magnets and one or more coils that electromagnetically interact with one another to produce Lorentz forces that move the prism carrier 204 together (e.g., in lockstep) with the prism 202 relative to the base structure 206. For example, the drive magnet 208 may be positioned proximate the drive coil 210 so that they are capable of electromagnetically interacting with one another to tilt the prism carrier 204 and the prism 202, e.g., relative to the base structure 206, one or more optical elements (e.g., lens group 110 in FIG. 1), and/or an image sensor (e.g., image sensor 112 in FIG. 1). In some embodiments, the drive magnet 208 may be attached to a stationary structure, such as the base structure 206. The drive coil 210 may be attached to a moveable structure, such as the prism carrier 204. In some embodiments, the drive magnet 208 and/or the drive coil 210 may have a respective longest dimension that extends in the Y-axis direction. According to various embodiments, the drive coil 210 may be oriented such that current flows through the drive coil in directions parallel to the X-Y plane.

According to some examples, the drive magnet 208 and/or the drive coil 210 may be positioned behind and/or underneath the reflecting surface side of the prism 202, e.g., as indicated in FIG. 2A. For example, at least a portion of the prism 202 may be positioned, in the X-axis direction between the magnet-coil pair (comprising the drive magnet 208 and the drive coil 210) and a lens group (e.g., lens group 110 in FIG. 1) in some embodiments.

In some embodiments, the spring suspension arrangement may include one or more sheet springs 212 and/or one or more suspension wires 214. Some examples may include a first sheet spring 212 and a first suspension wire 214 to a first side of the prism 202 (e.g., proximate a first side of the prism carrier 204). Furthermore, in some examples the spring suspension arrangement may include a second sheet spring 212 and a second suspension wire 214 to a second side of the prism 202 (e.g., proximate a second side of the prism carrier 204 that is opposite the first side of the prism carrier 204, relative to prism 202). A different number of sheet springs 212 and/or a different number of suspension wires 214 may be used in various embodiments.

Figure 3A:
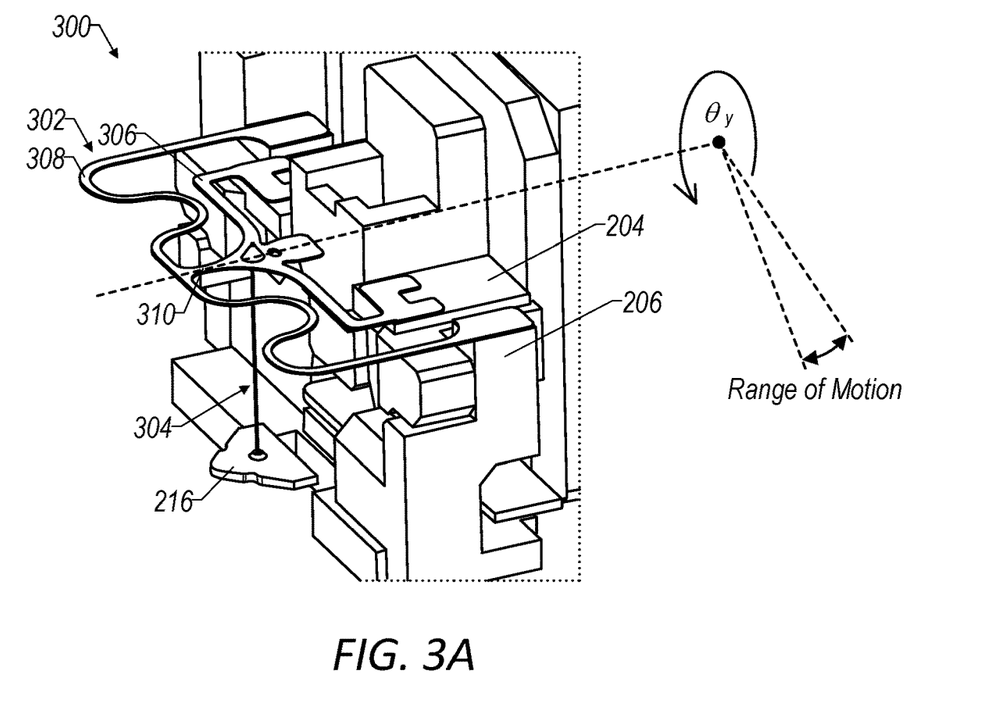
FIG. 3A shows a perspective view of the spring suspension arrangement.
Figure 3B:
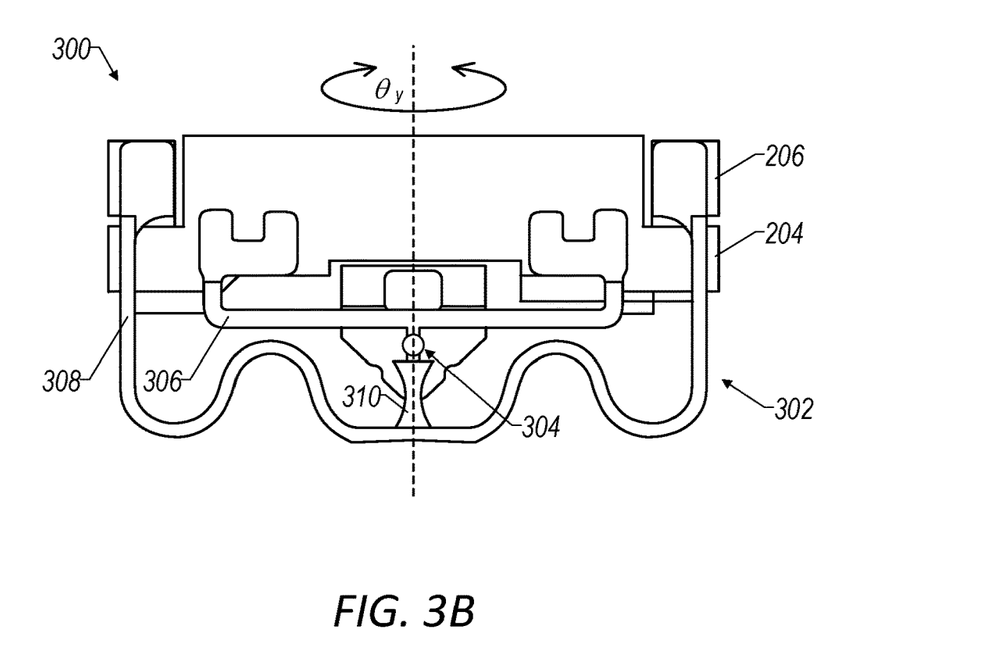

As discussed in further detail herein with reference to FIGS. 3A-3B, a respective sheet spring (e.g., spring 302 in FIGS. 3A-3B) may include a first portion (e.g., first spring portion 306 in FIGS. 3A-3B) attached to the prism carrier 204, a second portion (e.g., second spring portion 308 in FIGS. 3A-3B) attached to the base structure 206, and/or a third portion (e.g., third spring portion 310 in FIGS. 3A-3B) that interconnects the first portion with the second portion. In some embodiments, the third portion may extend in a first direction (e.g., the Y-axis direction) that is parallel to a tilt axis (an axis about which the prism 202 and the prism carrier 204 are tilted by the actuator(s)), from the first portion to the second portion. In some embodiments, a respective sheet spring 212 may be a flexure formed from a sheet of material (e.g., sheet metal). While in some embodiments a respective sheet spring 212 may be a monolithic component that is integrally formed (e.g., from a sheet of material), the suspension spring arrangement may additionally, or alternatively, include a spring/flexure formed from multiple components that are joined together to collectively function in the manner described herein with reference to the sheet spring 212 and/or the spring(s) 302 in FIGS. 3A-4D.

In some embodiments, a respective suspension wire 214 may extend, in a second direction (e.g., the Z-axis direction) that is orthogonal to the first direction (and/or orthogonal to the tilt axis), from a respective sheet spring 212 to a stationary structure 216. In some embodiments, the stationary structure 216 may be part of, and/or connected to, the base structure 206. For example, the stationary structure 216 may be a metallic tab that is attached to the base structure 206 in some embodiments. The suspension wire 214 may be attached to the sheet spring 212 and to the stationary structure 216 at respective joints 218 (e.g., solder joints). For example, a first portion (e.g., an upper end) of the suspension wire 214 may be attached to the sheet spring 212 via a first solder joint, and/or a second portion (e.g., a lower end) of the suspension wire 214 may be attached to the stationary structure 216 via a second solder joint. According to some non-limiting embodiments, the first portion of the suspension wire 214 may be attached to the first portion of the sheet spring 212, e.g., proximate to the third portion of the sheet spring 212.

In some embodiments, the camera and/or the prism module 200 may include a flex circuit 220 that is attached to the base structure 206, e.g., as indicated in FIGS. 2A-2B. The flex circuit 220 may be used to convey electrical current to the drive coil 210, e.g., via the suspension wire(s) 214 and the sheet spring(s) 212. The flex circuit 220 may be coupled with other circuitry (not shown) of the camera. For example, the flex circuit 220 may be coupled with another flex circuit 220 comprising a driver integrated circuit used for driving the drive coil 210.

According to some embodiments, the camera and/or the prism module 200 may include one or more damping pins 222 that may be configured to dampen motion of the prism carrier 204, e.g., during actuation. In some embodiments, a first portion of a respective damping pin 222 may be attached to a stationary structure (e.g., the base structure 206, as indicated in FIG. 2B). The damping pin may extend (e.g., in the X-axis direction) towards a pocket 224 (and/or a cavity, a recess, or the like) within which a viscoelastic material is contained. The pocket 224 may be defined by a portion of the prism carrier 204. In some embodiments, a second portion of the damping pin 222 may be disposed within the viscoelastic material contained in the pocket 224, so as to interface with the viscoelastic material to dampen motion. In some embodiments, the second portion of the damping pin 222, that is disposed within the viscoelastic material, may be distal to the first portion of the damping pin 222. The damping pin 222 may include one or more bend portions. For example, the damping pin 222 may include a bend portion that allows the second portion to extend in a different direction (e.g., the Z-axis direction) than the first portion. According to some embodiments, the camera and/or the prism module 200 may include a first damping group (e.g., comprising a first damping pin 222 and a first pocket 224 containing a viscoelastic material) to a first side of the prism 202, and a second damping group (e.g., comprising a second damping pin 222 and a second pocket 224 containing viscoelastic material) to a second side of the prism 202, e.g., to form a damping arrangement having mirror symmetry (between the first damping group and the second damping group) with respect to the X-Z plane.

In some embodiments, the camera and/or the prism module 200 may include one or more probe magnets 226 and one or more position sensors 228. For example, a respective probe magnet 226 may be attached to the prism carrier 204, and a corresponding position sensor 228 may be positioned proximate the probe magnet 226, such that the position sensor 228 is capable of sensing changes in the magnetic field(s) of the probe magnet 226, e.g., as the probe magnet 226 moves together with the prism carrier 204. In some embodiments, the position sensor(s) 228 may be attached to (or otherwise coupled with) the flex circuit 220. The position sensor(s) 228 may be magnetic field sensors (e.g., Hall sensors, tunneling magnetoresistance (TMR) sensors, giant magnetoresistance (GMR) sensors, etc.) in various embodiments. According to some embodiments, the camera and/or the prism 200 may include a first probe magnet 226 and a first position sensor 228 to a first side of the prism 202, and a second probe magnet 226 and a second position sensor 228 to a second side of the prism 202 that is opposite the first side of the prism 202. Each of the probe magnets 226 may be attached to an underside of a respective vertical column portion (e.g., extending in the Z-axis direction) of the prism carrier 204. An upper portion of the respective vertical column portion may define the pocket 224 for containing the viscoelastic material in some embodiments.

In some embodiments, the base structure 206 may include one or more end stop surfaces 230 that may limit the range of motion of the prism carrier 204 in one or more directions. In some examples, the limited range of motion may be designed to prevent the suspension spring arrangement from exceeding a flexion/deflection threshold associated with a maximum range of motion beyond which further flexion/deflection would jeopardize the structural integrity of the sheet spring(s) 212 and/or the suspension wire(s) 214.

FIGS. 3A and 3B illustrate views of an example spring suspension arrangement 300 that may be used in a camera (e.g., camera 100 in FIG. 1) having a folded optics arrangement and/or a tilt actuator. The spring suspension arrangement 300 described herein with reference to FIGS. 3A-3B may be the same as, or similar to, one or more of the spring suspension arrangements described herein with reference to FIGS. 1-2B in various embodiments. FIG. 3A shows a perspective view of the spring suspension arrangement 300. FIG. 3B shows a top view of the spring suspension arrangement 300. The spring suspension arrangement 300 is shown in the context of a portion of a prism module.

In some embodiments, the spring suspension arrangement 300 may include one or more springs 302 and/or one or more wires 304. The spring suspension arrangement 300 may comprise multiple portions that function in different manners. For example, a spring 302 may include a first spring portion 306, a second spring portion 308, and a third spring portion 310. The first spring portion 306 may be attached to the prism carrier 204. The second spring portion 308 may be attached to the base structure 206. The third spring portion 310 may interconnect the first spring portion 306 with the second spring portion 308. Furthermore, the third spring portion may extend, in a first direction parallel to the tilt axis (about which the actuator tilts the prism carrier 204), from the first spring portion 306 to the second spring portion 308. In some embodiments, the first direction may be the Y-axis direction.

In some embodiments, a wire 304 may extend, in a second direction orthogonal to the first direction, from the spring 302 to a stationary structure of the camera. In some embodiments, the second direction may be the Z-axis direction. According to some embodiments, an upper portion of the wire 304 may be attached to the spring 302, e.g., at or near the third spring portion 310, at or near the first spring portion 306, and/or at or near a junction between the first spring portion 306 and the third spring portion 310. The wire 304 may extend downwards from the upper portion to a lower portion that is attached to the stationary structure. In some embodiments, the stationary structure may be part of the base structure 206. In some embodiments, the stationary structure may be a component (e.g., a metallic tab) that is attached to the base structure 206.

In some embodiments, the third spring portion 310 may be a torsion member that functions as the primary engagement element of the spring suspension arrangement 300 with respect to tilt motion about the Y-axis. According to some embodiments, the spring suspension arrangement 300 may be designed such that a range of motion is allowed via twisting of the third spring portion 310. In some examples, the third spring portion 310 may be tuned to provide a limited range of motion. As a non-limiting example, the range of motion may be limited to about 2 degrees. The range of motion may be different in various embodiments. Furthermore, in some embodiments the tilt about the Y-axis may be considered the functional degree of freedom, and the spring suspension arrangement 300 may be designed to counteract motion in other degrees of freedom, such as translation (e.g., in X, Y, and Z) and/or tilt (e.g., about the X- and Z-axes). In some embodiments, the first spring portion 306 and the wire 304 may play the primary role in supporting the prism carrier 204 in the Z-axis direction, and/or counteracting motion of the prism carrier 204 in the Z-axis direction. Additionally, or alternatively, the second spring portion 308 may play the primary role in counteracting motion of the prism carrier 204 in directions parallel to the X-Y plane. According to some embodiments, the geometry (e.g., size, shape, bends, etc.) of different portions of the spring 302 may be independently tuned to achieve the desired modal performance.

In some embodiments, the first spring portion 306 may have a first end attached to a first portion of the prism carrier 204, and a second end attached to a second portion of the prism carrier 204, e.g., as indicated in FIGS. 3A-3B. Furthermore, the second spring portion 308 may have a first end attached to a first upper protrusion of the base structure 206 (e.g., proximate the attachment of the first end of the first spring portion 306 to the first portion of the prism carrier 204), and a second end attached to a second upper protrusion of the base structure 206 (e.g., proximate the attachment of the second end of the first spring portion 306 to the second portion of the prism carrier 204).

Figure 4A:
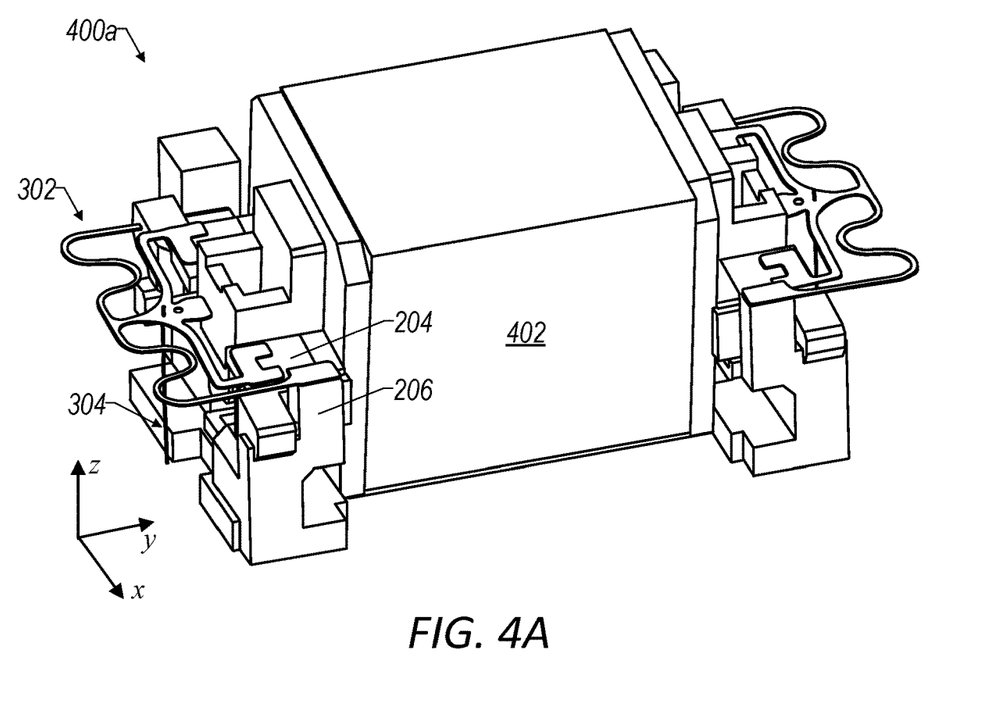
FIG. 4A shows a rest state corresponding to the spring suspension arrangement being in a rest position.
Figure 4B:
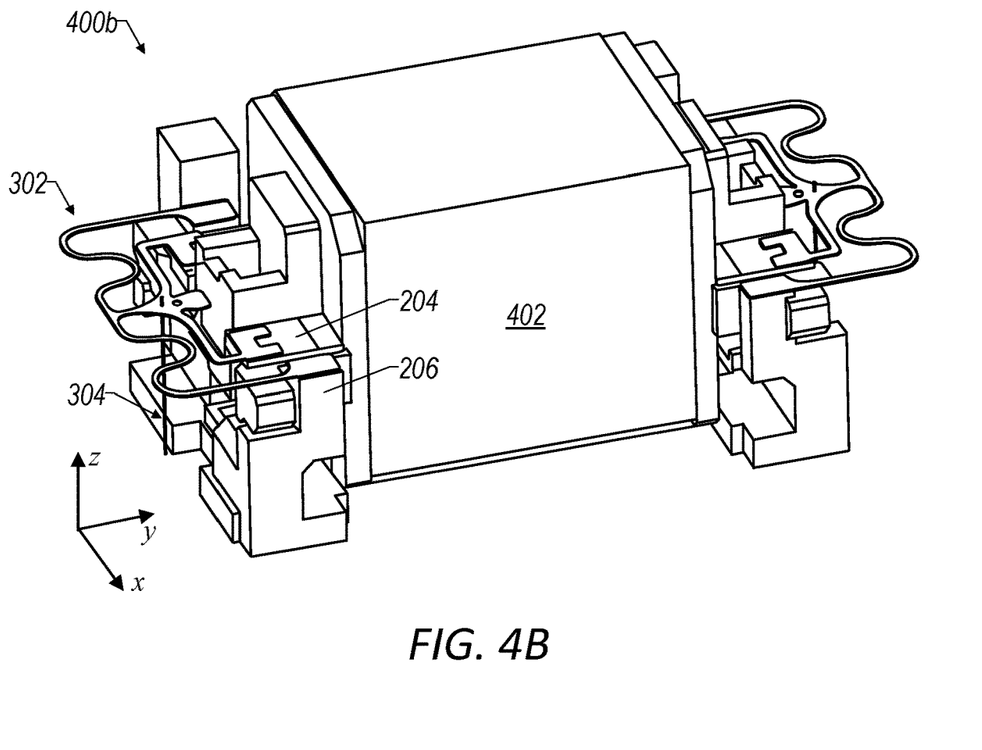
FIG. 4B shows a first deflection state indicating deflection of the spring suspension arrangement when the prism tilts, relative to the rest position, about a first axis (e.g., a Y-axis).
Figure 4C:
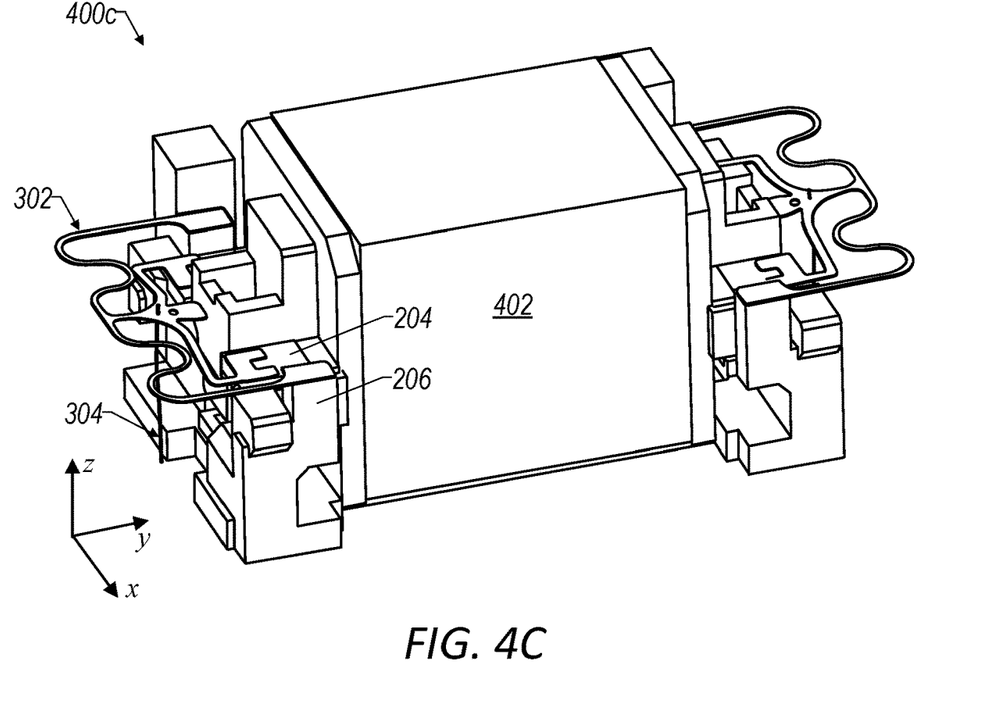
FIG. 4C shows a second deflection state indicating deflection of the spring suspension arrangement when the prism translates, relative to the rest position, in a first direction (e.g., a Z-axis direction).
Figure 4D:
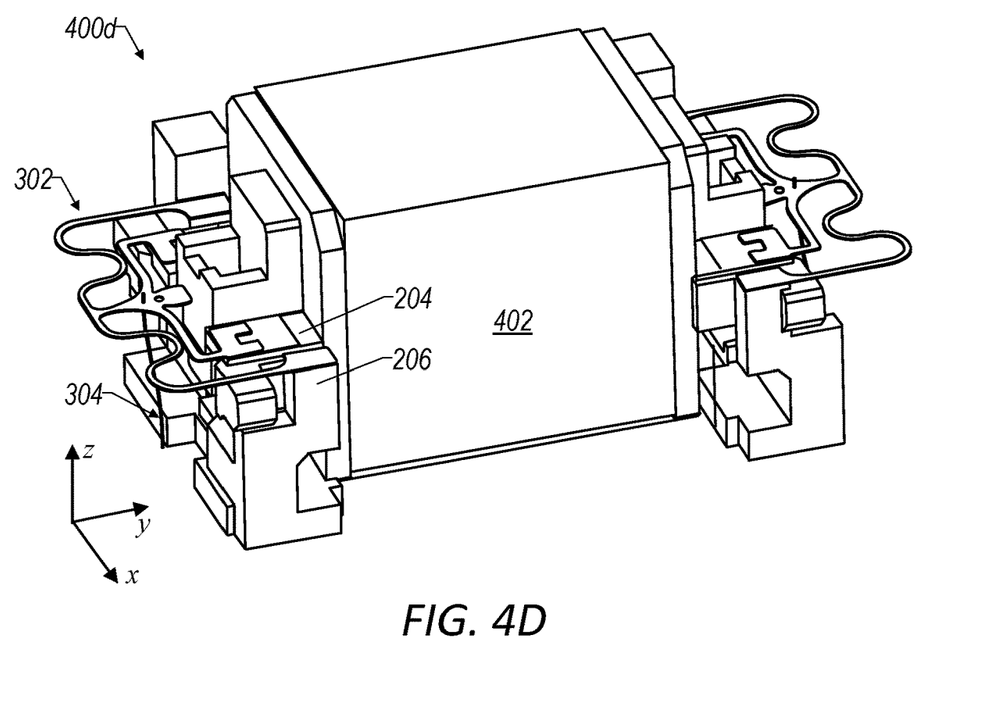
FIG. 4D shows a third deflection state indicating deflection of the spring suspension arrangement when the prism translates, relative to the rest position, in a second direction (e.g., a Y-axis direction).

FIGS. 4A-4D illustrate views of an example spring suspension arrangement that may be used, for example, in a prism module having a prism that may be tilted via a tilt actuator, in accordance with some embodiments. FIG. 4A shows a rest state 400a corresponding to the spring suspension arrangement 400a being in a rest position. In some examples, in the rest position may correspond to a position of the spring suspension arrangement when the prism 402 is not moving. FIG. 4B shows a first deflection state 400b indicating deflection of the spring suspension arrangement when the prism 402 tilts, relative to the rest position, about a first axis (e.g., a Y-axis). FIG. 4C shows a second deflection state 400c indicating deflection of the spring suspension arrangement when the prism 402 translates, relative to the rest position, in a first direction (e.g., a Z-axis direction). FIG. 4D shows a third deflection state 400d indicating deflection of the spring suspension arrangement when the prism 402 translates, relative to the rest position, in a second direction (e.g., a Y-axis direction).

Figure 5:
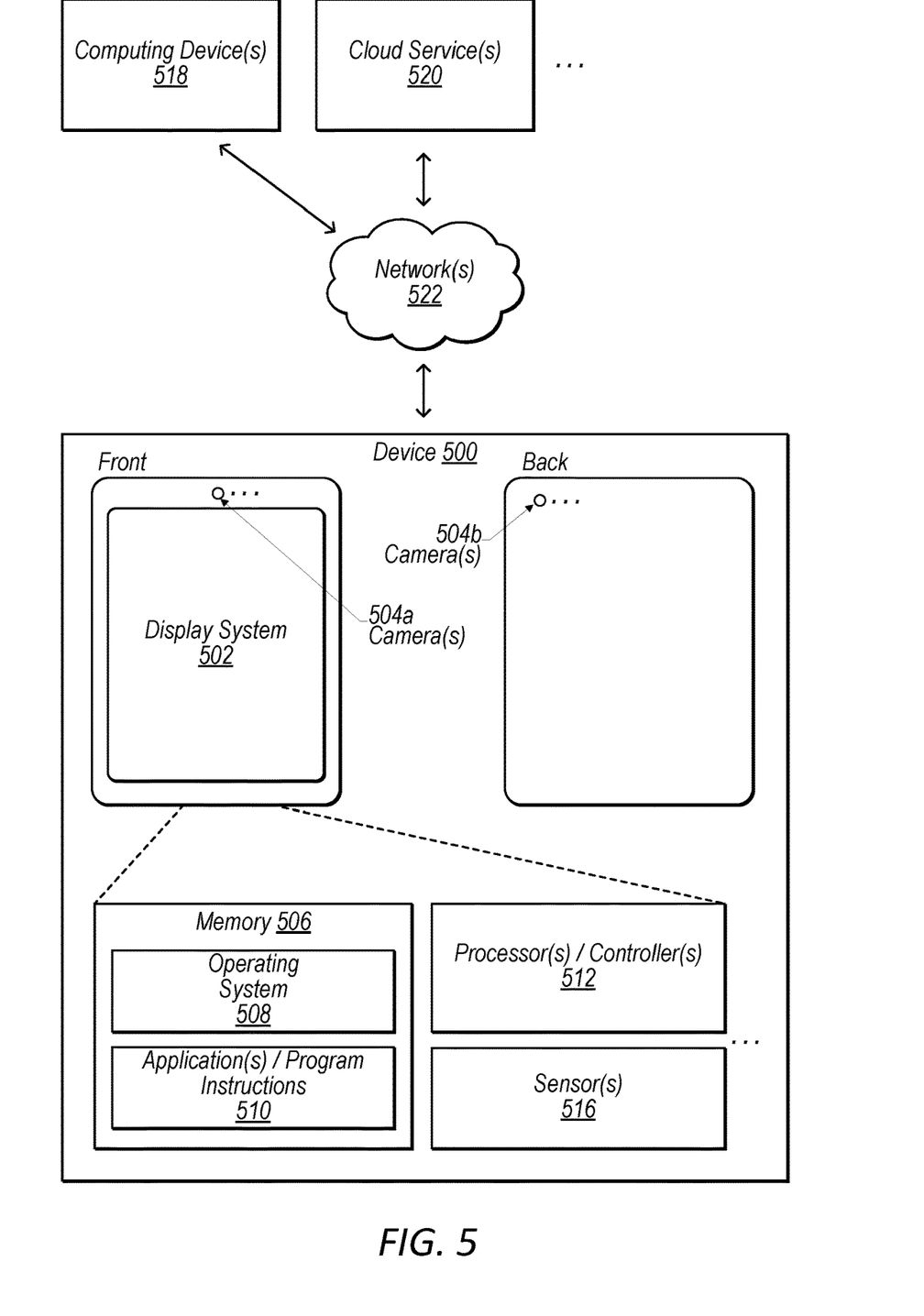
FIG. 5 illustrates a schematic representation of an example device that may include a camera having a folded optics arrangement with a tilt actuator and/or a spring suspension arrangement, in accordance with some embodiments.

FIG. 5 illustrates a schematic representation of an example device 500 that may include a camera (e.g., camera 100 in FIG. 1) having a folded optics arrangement with a tilt actuator and/or a spring suspension arrangement, e.g., as described herein with reference to FIGS. 1-4D. In some embodiments, the device 500 may be a mobile device and/or a multifunction device. In various embodiments, the device 500 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 500 may include a display system 502 (e.g., comprising a display and/or a touch-sensitive surface) and/or one or more cameras 504. In some non-limiting embodiments, the display system 502 and/or one or more front-facing cameras 504a may be provided at a front side of the device 500, e.g., as indicated in FIG. 5. Additionally, or alternatively, one or more rear-facing cameras 504b may be provided at a rear side of the device 500. In some embodiments comprising multiple cameras 504, some or all of the cameras may be the same as, or similar to, each other. Additionally, or alternatively, some or all of the cameras may be different from each other. In various embodiments, the location(s) and/or arrangement(s) of the camera(s) 504 may be different than those indicated in FIG. 5.

Among other things, the device 500 may include memory 506 (e.g., comprising an operating system 508 and/or application(s)/program instructions 510), one or more processors and/or controllers 512 (e.g., comprising CPU(s), memory controller(s), display controller(s), and/or camera controller(s), etc.), and/or one or more sensors 516 (e.g., orientation sensor(s), proximity sensor(s), and/or position sensor(s), etc.). In some embodiments, the device 500 may communicate with one or more other devices and/or services, such as computing device(s) 518, cloud service(s) 520, etc., via one or more networks 522. For example, the device 500 may include a network interface (e.g., network interface 610) that enables the device 500 to transmit data to, and receive data from, the network(s) 522. Additionally, or alternatively, the device 500 may be capable of communicating with other devices via wireless communication using any of a variety of communications standards, protocols, and/or technologies.

Figure 6:
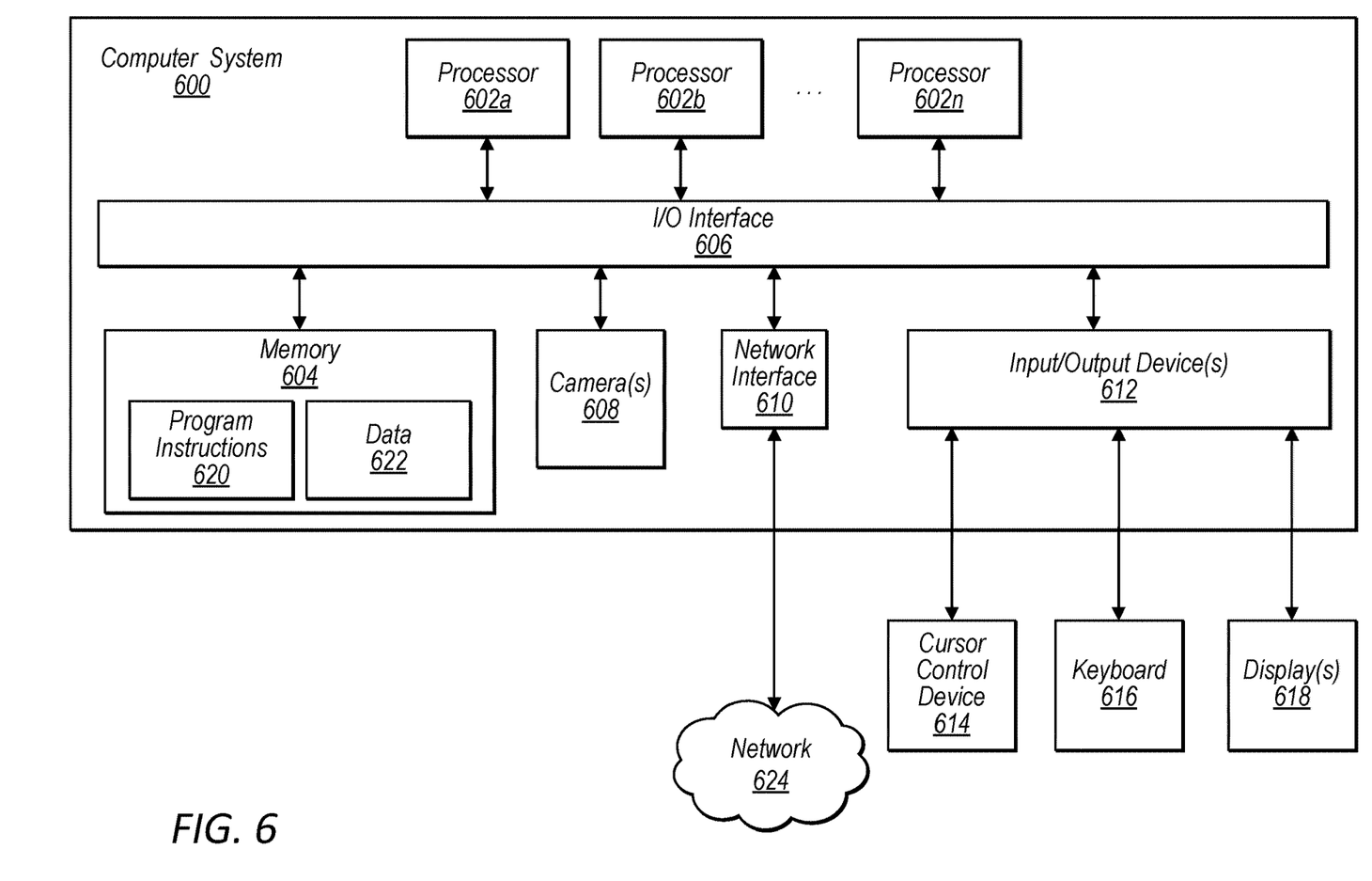
FIG. 6 illustrates a schematic block diagram of an example computer system that may include a camera having a folded optics arrangement with a tilt actuator and/or a spring suspension arrangement, in accordance with some embodiments.

FIG. 6 illustrates a schematic block diagram of an example computing device, referred to as computer system 600, that may include or host embodiments of a camera having a sensor shift actuator and/or a suspension arrangement, e.g., as described herein with reference to FIGS. 1-5. In addition, computer system 600 may implement methods for controlling operations of the camera and/or for performing image processing images captured with the camera. In some embodiments, the device 500 (described herein with reference to FIG. 5) may additionally, or alternatively, include some or all of the functional components of the computer system 600 described herein.

The computer system 600 may be configured to execute any or all of the embodiments described above. In different embodiments, computer system 600 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 600 includes one or more processors 602 coupled to a system memory 604 via an input/output (I/O) interface 606. Computer system 600 further includes one or more cameras 608 coupled to the I/O interface 606. Computer system 600 further includes a network interface 610 coupled to I/O interface 606, and one or more input/output devices 612, such as cursor control device 614, keyboard 616, and display(s) 618. In some cases, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 602, or a multiprocessor system including several processors 602 (e.g., two, four, eight, or another suitable number). Processors 602 may be any suitable processor capable of executing instructions. For example, in various embodiments processors 602 may be general-purpose or embedded processors implementing any of a variety of instruction set architectures (ISAs), such as the x86, PowerPC, SPARC, or MIPS ISAs, or any other suitable ISA. In multiprocessor systems, each of processors 602 may commonly, but not necessarily, implement the same ISA.

System memory 604 may be configured to store program instructions 620 accessible by processor 602. In various embodiments, system memory 604 may be implemented using any suitable memory technology, such as static random access memory (SRAM), synchronous dynamic RAM (SDRAM), nonvolatile/Flash-type memory, or any other type of memory. Additionally, existing camera control data 622 of memory 604 may include any of the information or data structures described above. In some embodiments, program instructions 620 and/or data 622 may be received, sent or stored upon different types of computer-accessible media or on similar media separate from system memory 604 or computer system 600. In various embodiments, some or all of the functionality described herein may be implemented via such a computer system 600.

In one embodiment, I/O interface 606 may be configured to coordinate I/O traffic between processor 602, system memory 604, and any peripheral devices in the device, including network interface 610 or other peripheral interfaces, such as input/output devices 612. In some embodiments, I/O interface 606 may perform any necessary protocol, timing or other data transformations to convert data signals from one component (e.g., system memory 604) into a format suitable for use by another component (e.g., processor 602). In some embodiments, I/O interface 606 may include support for devices attached through various types of peripheral buses, such as a variant of the Peripheral Component Interconnect (PCI) bus standard or the Universal Serial Bus (USB) standard, for example. In some embodiments, the function of I/O interface 606 may be split into two or more separate components, such as a north bridge and a south bridge, for example. Also, in some embodiments some or all of the functionality of I/O interface 606, such as an interface to system memory 604, may be incorporated directly into processor 602.

Network interface 610 may be configured to allow data to be exchanged between computer system 600 and other devices attached to a network 624 (e.g., carrier or agent devices) or between nodes of computer system 600. Network 624 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 610 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 612 may, in some embodiments, include one or more display terminals, keyboards, keypads, touchpads, scanning devices, voice or optical recognition devices, or any other devices suitable for entering or accessing data by one or more computer systems 600. Multiple input/output devices 612 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 610.

Those skilled in the art will appreciate that computer system 600 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
a light folding element to fold a path of light;
a carrier that is coupled with the light folding element, such that the carrier is moveable together with the light folding element;
a base structure that is stationary relative to motion of the carrier;
an image sensor to capture image data based on the light that has been folded by the light folding element;
an actuator comprising a stationary magnet to tilt, about a tilt axis, the light folding element relative to the image sensor, wherein the stationary magnet is stationary within the camera; and
a suspension arrangement to suspend the carrier from the base structure and to allow motion of the light folding element enabled by the actuator, the suspension arrangement comprising:
 one or more springs, comprising:
  a first spring portion attached to the carrier;
  a second spring portion attached the base structure; and
  a third spring portion that interconnects the first spring portion with the second spring portion, wherein the third spring portion extends, in a direction parallel to the tilt axis, from the first spring portion to the second spring portion.

2. The camera of claim 1, wherein:
the direction parallel to the tilt axis is a first direction; and
the suspension arrangement further comprises: a wire that extends, in a second direction that is orthogonal to the first direction, from the one or more springs to a stationary structure of the camera.

3. The camera of claim 2, further comprising:
a flex circuit;
wherein the actuator comprises a coil and the stationary magnet; and
wherein the camera is configured to convey electrical current from the flex circuit to the coil via the wire and at least a portion of the one or more springs, and wherein the electrical current is for driving the coil so that the coil electromagnetically interacts with the stationary magnet.

4. The camera of claim 2, wherein:
the one or more springs comprise a first sheet spring attached to a first portion of the carrier;
the wire comprises a first wire attached to the first sheet spring; and
the suspension arrangement further comprises:
 a second sheet spring attached to a second portion of the carrier, wherein the second portion is opposite the first portion relative to the light folding element and relative to a plane defined by the path of light that is folded by the light folding element; and
 a second wire attached to the second sheet spring.

5. The camera of claim 1, wherein:
the one or more springs comprise a flexure formed from a sheet; and
the flexure comprises the first spring portion, the second spring portion, and the third spring portion.

6. The camera of claim 1, wherein the actuator comprises:
a coil attached to the carrier such that the coil is moveable together with the carrier, wherein the coil is located proximate the stationary magnet such that the coil is capable of electromagnetically interacting with the stationary magnet to produce Lorentz forces that tilt the carrier and the light folding element about the tilt axis.

7. The camera of claim 1, wherein the light folding element comprises:
a prism; or
a mirror.

8. A system, comprising:
a carrier to couple with a light folding element, such that the carrier is moveable together with the light folding element;
a base structure that is stationary relative to motion of the carrier;
an actuator comprising a stationary magnet to tilt, about a tilt axis, the light folding element relative to an image sensor of a camera, wherein the stationary magnet is stationary relative to motion of the carrier, wherein the light folding element is to fold a path of light before the light reaches the image sensor; and
a suspension arrangement to suspend the light folding element from the base structure and to allow motion of the light folding element enabled by the actuator, the suspension arrangement comprising:
one or more springs, comprising:
a first spring portion attached to the carrier;
a second spring portion attached the base structure; and
a third spring portion that interconnects the first spring portion with the second spring portion, wherein the third spring portion extends, in a direction parallel to the tilt axis, from the first spring portion to the second spring portion.

9. The system of claim 8, wherein:
the direction parallel to the tilt axis is a first direction; and
the suspension arrangement further comprises: a wire that extends, in a second direction that is orthogonal to the first direction, from the one or more springs to a stationary structure of the camera.

10. The system of claim 9, further comprising:
a flex circuit;
wherein the actuator comprises a coil and the stationary magnet; and
wherein the camera is configured to convey electrical current from the flex circuit to the coil via the wire and at least a portion of the one or more springs, and wherein the electrical current is for driving the coil so that the coil electromagnetically interacts with the stationary magnet.

11. The system of claim 10, further comprising:
a probe magnet attached to the carrier; and
a position sensor attached to the flex circuit and positioned proximate the probe magnet, such that the position sensor is capable of detecting changes in the magnetic fields of the probe magnet as the carrier moves.

12. The system of claim 9, wherein:
the one or more springs comprise a first sheet spring attached to a first portion of the carrier;
the wire comprises a first wire attached to the first sheet spring; and
the suspension arrangement further comprises:
a second sheet spring attached to a second portion of the carrier, wherein the second portion is opposite the first portion relative to the light folding element and relative to a plane defined by the path of light that is folded by the light folding element; and
a second wire attached to the second sheet spring.

13. The system of claim 8, wherein the actuator comprises:
a coil attached to the carrier such that the coil is moveable together with the carrier, wherein the coil is located proximate the stationary magnet such that the coil is capable of electromagnetically interacting with the stationary magnet to produce Lorentz forces that tilt the carrier and the light folding element about the tilt axis.

14. The system of claim 8, wherein the light folding element comprises a prism.

15. The system of claim 8, further comprising:
a damping pin attached to the base structure, wherein a portion of the damping pin is disposed in a viscoelastic material contained in a pocket defined by the carrier, and wherein the damping pin is to dampen motion of the carrier.

16. A device, comprising:
one or more processors;
memory storing program instructions executable by the one or more processors to control operations of a camera; and
the camera, comprising:
a light folding element that receives light along a first optical axis and folds a path of the light from the first optical axis to a second optical axis;
a carrier that is coupled with the light folding element, such that the carrier is moveable together with the light folding element;
a base structure that is stationary relative to motion of the carrier;
an image sensor to capture image data based on the light that has been folded by the light folding element;
an actuator comprising a stationary magnet to tilt, about a tilt axis, the light folding element relative to the image sensor, wherein the stationary magnet is stationary within the camera; and
a suspension arrangement to suspend the carrier from the base structure and to allow motion of the light folding element enabled by the actuator, the suspension arrangement comprising:
one or more springs, comprising:
a first spring portion attached to the carrier;
a second spring portion attached the base structure; and
a third spring portion that interconnects the first spring portion with the second spring portion, wherein the third spring portion extends, in a direction parallel to the tilt axis, from the first spring portion to the second spring portion.

17. The device of claim 16, wherein:
the direction parallel to the tilt axis is a first direction; and
the suspension arrangement further comprises:
a wire that extends, in a second direction that is orthogonal to the first direction, from the one or more springs to a stationary structure of the camera.

18. The device of claim 17, wherein:
the light folding element comprises a prism; and
the third spring portion is a torsion member that twists in compliance to tilt of the carrier and the prism about the tilt axis.

19. The device of claim 18, wherein:
the wire is stiffer, in the second direction, than the second spring portion;
the first spring portion is configured to have flex to a greater degree than the second spring portion when the prism moves in the second direction; and the second spring portion is configured to flex to a greater degree than the first spring portion when the prism moves in the first direction.

20. The device of claim 16, wherein the actuator comprises:
a coil attached to the carrier such that the coil is moveable together with the carrier, wherein the coil is located proximate the stationary magnet such that the coil is capable of electromagnetically interacting with the stationary magnet to produce Lorentz forces that tilt the carrier and the light folding element about the tilt axis.

* * * * *